US005633457A

United States Patent [19]

Kilar et al.

[11] Patent Number: 5,633,457

[45] Date of Patent: May 27, 1997

[54] FUEL INJECTION CLEANING AND TESTING SYSTEM AND APPARATUS

[75] Inventors: John R. Kilar, Ann Arbor; Robert A. Henderson, Southgate, both of Mich.

[73] Assignee: Triangle Special Products, Garden City, Mich.

[21] Appl. No.: 351,256

[22] PCT Filed: Jun. 5, 1992

[86] PCT No.: PCT/US92/04666

§ 371 Date: Dec. 5, 1994

§ 102(e) Date: Dec. 5, 1994

[87] PCT Pub. No.: WO93/25888

PCT Pub. Date: Dec. 23, 1993

[51] Int. Cl.[6] ........ G01N 19/00

[52] U.S. Cl. ........ 73/119 A

[58] Field of Search ........ 73/119 A, 118.1, 73/116; 239/106, 112, 113; 123/198 A

[56] References Cited

U.S. PATENT DOCUMENTS

| | | | |
|---|---|---|---|
| 4,030,351 | 6/1977 | Smith | 73/119 R |
| 4,671,230 | 6/1987 | Turnipseed | 123/198 A |
| 4,877,043 | 10/1989 | Carmichael et al. | 123/198 A |
| 4,977,872 | 12/1990 | Hartopp | 73/119 A |
| 5,022,364 | 6/1991 | Phillips | 123/198 A |
| 5,097,806 | 3/1992 | Vataru et al. | 123/198 A |
| 5,117,683 | 6/1992 | Phillips | 73/119 A |
| 5,357,792 | 10/1994 | Getenby | 73/119 A |
| 5,381,810 | 1/1995 | Mosher | 123/198 A |
| 5,386,721 | 2/1995 | Alvizar | 73/118.1 |

*Primary Examiner*—Richard Chilcot
*Assistant Examiner*—George M. Dombroske
*Attorney, Agent, or Firm*—Harness, Dickey & Pierce

[57] ABSTRACT

A method and apparatus is described for cleaning the fuel injection system of a vehicle without disassembling the fuel injectors from the vehicle engine. The apparatus includes a pump separate and apart from the vehicle for feeding fuel into the fuel supply system and a controller for controlling the pump. The controller operates at least one fuel injector while the injector is disposed in operable association with said vehicle engine, and the pump operates in a fuel feeding mode and in a fuel withdrawing mode whereby to retract fuel from the system. The system associates said pump with said fuel supplying system and disables said fuel supplying system to permit said pump to be the sole source of the fuel supply for said at least one fuel injector. Further, the apparatus comprises a flow measuring device for measuring the flow of fuel through each injection valve during the operation of the injection valve and while the injection valve is operably secured to and associated with said engine, and a pulse controller for controlling the duration of fuel flow through each injection valve.

8 Claims, 6 Drawing Sheets

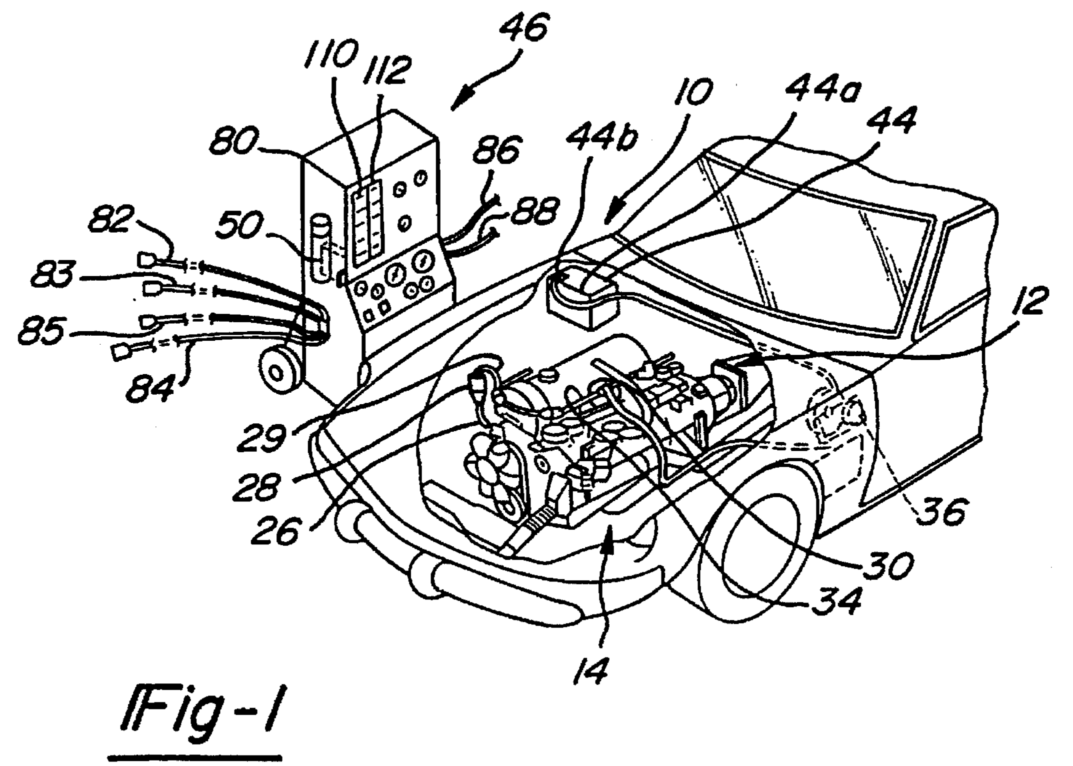
Fig-1
Fig-2
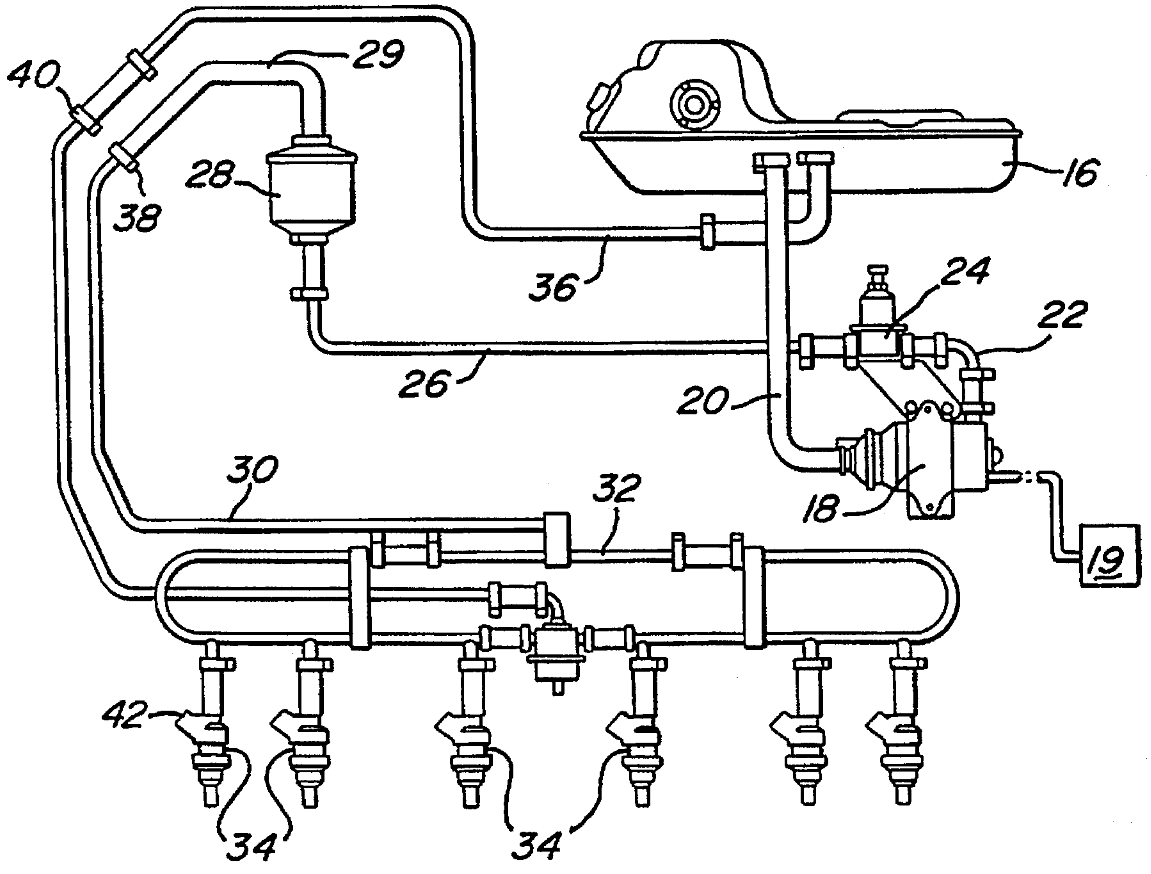

FUEL INJECTION CLEANING AND TESTING SYSTEM AND APPARATUS

BACKGROUND AND SUMMARY OF THE INVENTION

The present invention relates generally to a device for cleaning the fuel injection system of an engine and measuring flow through the individual injectors, and in particular to a fuel injector cleaner and injector flow measurement device for the engine of an automotive vehicle.

Fuel injected engines offer more performance, better mileage, and reduced exhaust emissions. These advantages are not without some disadvantages as fuel injectors are relatively expensive and sensitive both to fuel quality and fuel contamination. Further, fuel injectors are apt to gradually acquire deposits restricting the area of the fuel passage, which deposits can effect the fuel spray and thus the engine performance. It is typically not practicable to disassemble and discard expensive parts because of fuel quality or fuel contamination problems.

Most major fuel producers have developed additives for their fuels that contain solvents and detergents to prevent deposit accumulation. This will not solve the problem with vehicles in which deposits were already present. Further, many of the independent fuel producers do not include additives due to the increased expense. Customers are prone to use less expensive fuels, especially in older vehicles that are out of warranty. Most of these cheaper fuels do not contain sufficient additives to be effective.

To remove these deposits, apparatus has been proposed to clean the fuel injection system. Illustrative is GB 2117048, published Oct. 5, 1983, the specification being specifically incorporated herein by reference. GB 2117048 disclose that a chemical additive is added to a separate tank which is connected to and forms the fuel source for the vehicle engine. The chemical is mixed and pressure fed to the fuel injector system in substitution for the regular vehicle fuel supply. Thus the engine runs on the cleaning fluid gas mixture. However, residue and foreign material removed from the carbon covered surfaces are not necessarily removed from the system. If not completely removed, such residual particles contaminate the system and eventually return to the fuel tank for deposit therein. For example, excess fuel passed through the fuel rail and not used by the injectors is returned to the tank. The above problems create a need for equipment to remove deposits and restore engine fuel injection system performance.

Accordingly, it is an important object of the present invention to provide a carbon-cleaning apparatus for fuel injected engines that solve the aforementioned problems.

Another object of the invention is to provide a carbon-cleaning device for in situ cleaning of the injection valves of vehicle engines.

Another object of the invention is to provide a dynamic flow measurement device and method for each individual injector without removing any of the injectors from the engine, the flow device being integrated into the same device that cleans the injectors and utilizing most of the same components of such device.

Another object is provision of apparatus having pump means separate from the vehicle and a control therefor whereby the pump both feeds and extracts the cleaning fluid from the vehicle's fuel pumping system.

Another object is provision of apparatus having sensor means for sensing an excessive pressure drop across a filter thereby warning that the system filter is contaminated and should be changed.

Another object is provision of apparatus having means for pulsing the individual injectors during flow testing thereby simulating different engine operating conditions.

According to the present invention there is provided an apparatus for cleaning and/or testing the fuel injection system of a vehicle engine, and a method for each. The engine valve system is of the type including at least one fuel injector operably secured to and associated with the engine, fuel supplying means, including an engine pump, for supplying fuel to the fuel injector, injector controlling means for controlling the operation of the fuel injectors whereby to feed fuel to the engine cylinders associated with the injectors, and power means for powering the controlling means.

The cleaner apparatus in accordance with this invention comprises pump means separate and apart from the vehicle for feeding fuel into the fuel supplying means, control means for controlling the pump means, including means for operating said at least one fuel injector while said injector is disposed in operable association with said vehicle engine and means for operating the pump in a fuel feeding mode and in a fuel withdrawing mode whereby to retract fuel from the system, and means for operably associating said pump means with said fuel supplying means and disabling said fuel supplying means to permit said pump means to be the sole source of the fuel supply for said at least one fuel injector. Further, the apparatus comprises flow measuring means for measuring the flow of fuel through each injection valve during the operation of the injection valve and while the injection valve is operably secured to and associated with said engine, and pulse means for controlling the duration of fuel flow through each injection valve.

Advantageously, removal of the cleaning fluid from the vehicle engine eliminates or reduces the cleaning fluids contacted with those vehicle components which are likely to be corroded, recompounded, or otherwise corrupted by the cleaning fluid.

Advantageously, indication of a low system pressure signals the operator that the fuel mixture may be contaminated and to take corrective action whereby to prevent reintroduction of contaminants into the injectors.

Advantageously, alteration of the injector operating pulse allows the fuel injectors to be operated and tested over the full engine operational range and affords more realistic cleaning and testing under conditions more closely approximating real operating conditions.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 1 is an elevated perspective view of a vehicle having an engine with a fuel injection system to which a cleaner and tester apparatus of the present invention is to be operably attached.

FIG. 2 is a schematic view of the fuel injection system of the vehicle of FIG. 1.

DESCRIPTION OF THE PREFERRED EMBODIMENT

Figure 3:
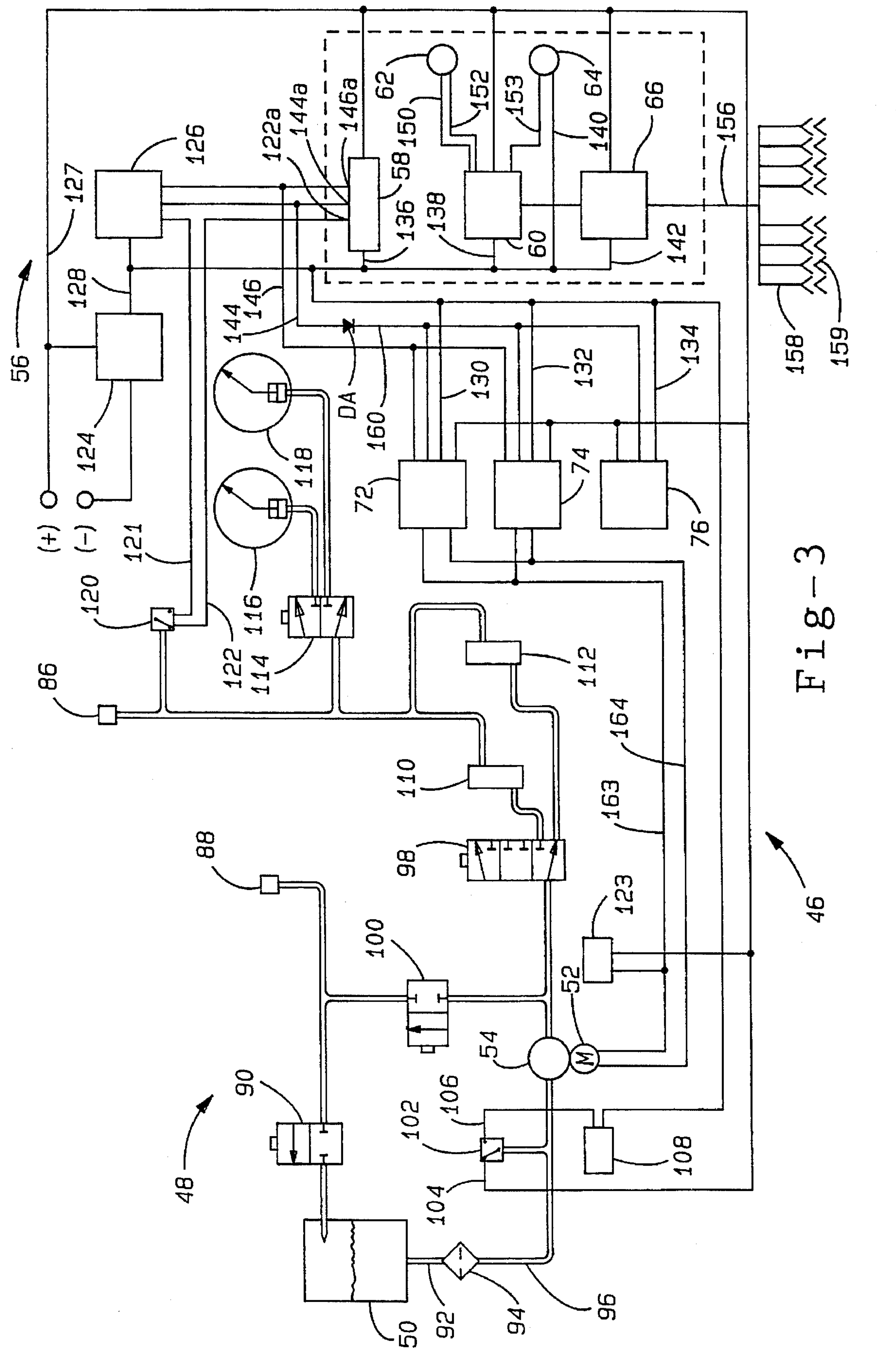
FIG. 3 is a schematic view of the fuel injection cleaner and tester apparatus including a hydraulic system for feeding fuel to the vehicle and an electrical control circuit for controlling the hydraulic system.
Figure 3A:
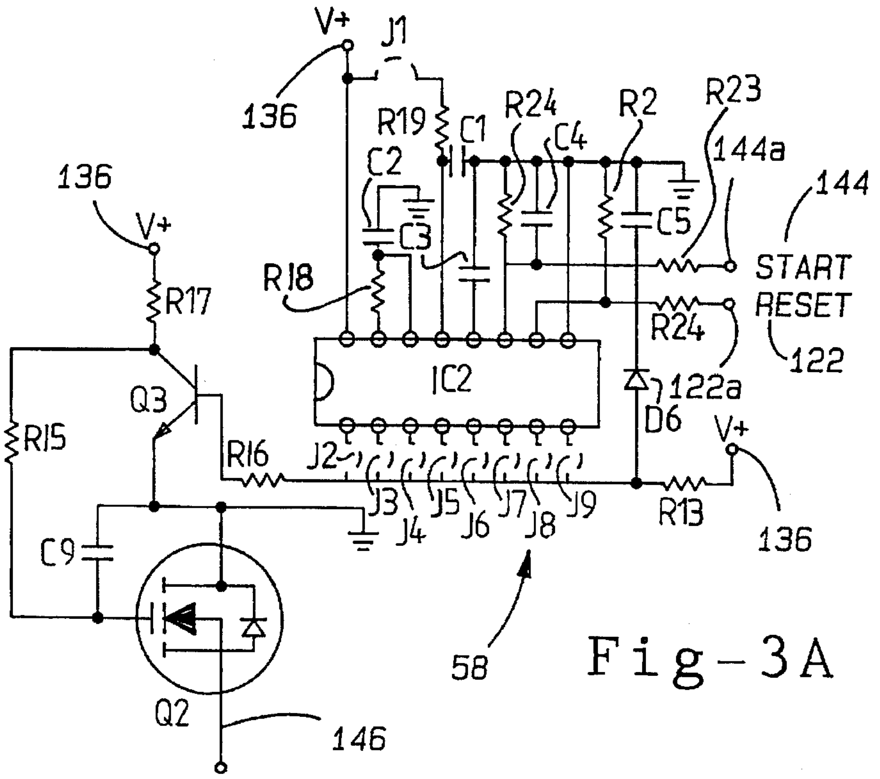
FIG. 3*a* is a schematic diagram of a timing circuit portion of the electrical control circuit.
Figure 3B:
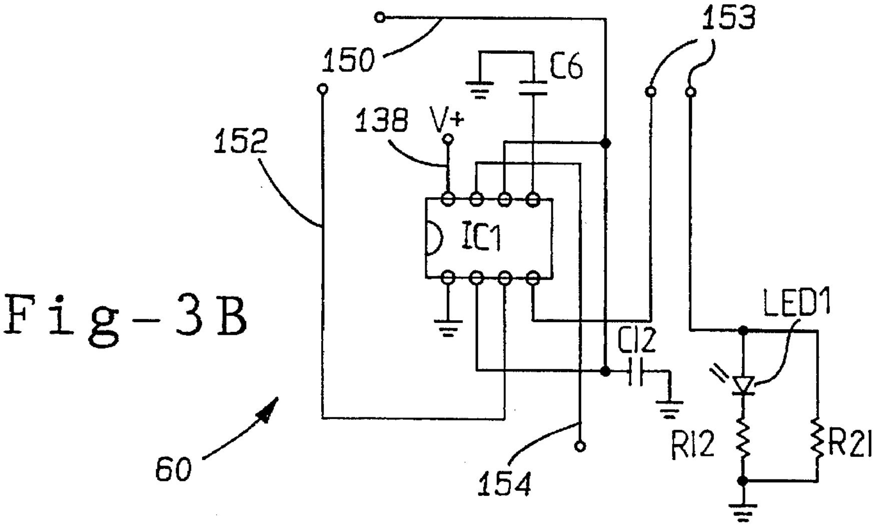
FIG. 3*b* is a schematic diagram of a pulse generator portion of the electrical control circuit.
Figure 3C:
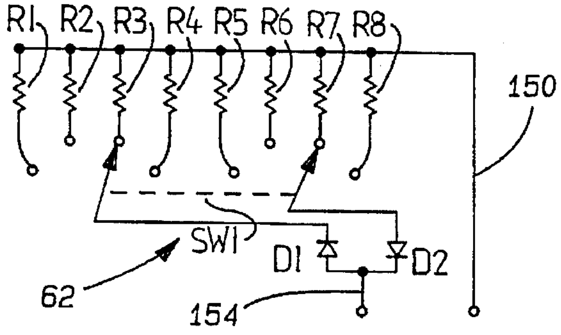
FIG. 3*c* is a schematic diagram of a pulse selector portion of the electrical control circuit.
Figure 3D:
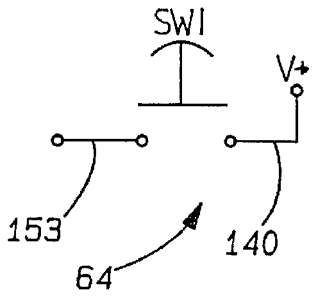
FIG. 3*d* is a schematic diagram of a test switch portion of the electrical control circuit.

Referring now to FIGS. 1 and 2, a vehicle 10 is shown having a fuel injection system 12 included and operably associated with an engine 14. The specific details of the vehicle are conventional, such as detailed in GB 2117048, and will only be briefly described herein.

The vehicle comprises a gas tank 16, a fuel pump 18 electrically controlled by a fuel pump relay mechanism 19, a fuel feed pipe 20 to feed fuel from the tank to the pump, and a fuel feed pipe 22 to feed fuel to a pressure regulator 24. A fuel feed pipe 26 communicates fuel through a fuel filter 28, to a fuel feed pipe 30, and into a fuel distribution manifold 32 whereby to distribute fuel into the fuel injection system. The manifold 32 communicates fuel to each of a series of fuel injectors 34 mounted on the engine. A fuel return pipe 36 communicates excess fuel back into the tank. The inlet and outlet fuel feed lines can be unconnected at respective points 38 and 40 whereby to form connectibis inlet and outlet ports to the engine manifold.

The construction of the fuel injector valve 34 is conventional and will not be described in detail. However, each fuel injector 34 includes a fuel outlet port to communicate fuel into one respective cylinder of the engine and an ignition post 42 to be connected to an electrical system. When the injector is energized, an electrical coil causes an interior pintle to move from an open to a closed position. If the pintle or the injector bore is clogged, fuel flow will be reduced and vehicle performance rendered poor.

The vehicle engine also includes an electronic control module (not shown) which is programmed to operate each of the injectors in sequence whereby to operate the car. Electrical power for the control module (i.e., the "ECM") is initially supplied by a battery 44, having positive and negative posts **44*a* and 44*b***, and by a generator (not shown) during operation of the engine. The battery is constantly recharged by operation of the engine in a conventional manner.

To operate the vehicle, the vehicle ignition switch is turned on, whereupon the battery energizes the fuel pump 18 and the ECM. The fuel pump feeds fuel to the fuel rail 32 and the ECM causes at least one fuel injector 34 to spray fuel into its cylinder and be combusted. Thereupon the engine crank rotates, and the ECM initiates the next fuel injector, and in seriatem.

According to this invention, as shown in FIG. 3, an apparatus for cleaning and testing the fuel injection system of the engine, shown generally at 46, is comprised of two parts, a fuel injection cleaning supply system 48, including a separate fuel tank 50 and a combination electrical motor 52 and fuel pump 54, and an electrical control system 56 for operating the cleaning supply system 48. The electrical control system 56 includes a timing section 58, a pulse generator section 60, a pulse selector section 62, a test switch section 64, a pulse output section 66, which includes a pulse shaper section 68, and a surge protection section 70. The electrical control system also includes electrical relays 72, 74 and 76 operably disposed in electrical communication with the motor 52.

In the embodiment shown, the supply and control systems 48 and 56 are adapted to be mounted, at least in part, on a cart 80 which can be transported into position against the vehicle and placed in operable relation with the engine and the fuel injectors to be cleaned and/or flow tested. It is to be understood that the cleaner tester apparatus 46 does not have to be movably mounted. For example, in some applications, an array of like cleaner and tester apparatus could be mounted in the user's service area at a common location.

The cleaner and tester apparatus 46 includes a pair of electrical cables 82 and 84, each respectively seriatim to the positive and negative posts **44*a* and 44*b* of the vehicle battery 44, or to a suitable electrical source, whereby to power the apparatus, and a pair of fluid hoses 86 and 88. The output hose 86 has an end coupling adapted to be connected to the inlet port 38 to the manifold whereby to pass cleaner solvent from the cleaner apparatus 46 tester to the vehicle engine and serve as the sole source of fuel during engine operation. The return hose 88 has an end coupling adapted to be connected to the return port 40 of the manifold whereby to return excess cleaner solvent which is not consumed by the vehicle's engine to the apparatus fuel supply tank 50 via a pressure regulator valve 90. The pressure regulator valve 90** allows the operator to adjust the pressure of the cleaning solvent mixture being delivered to the vehicle's injectors.

The fuel supply tank 50 communicates with the fuel pump 54 via the fuel line 92, a fuel filter 94, and a fuel line 96. The pump 54 draws the cleaning solvent fuel mixture from the supply tank 50 and through the filter 94 and supplies a filtered fuel mixture, under pressure, to a manually adjustable one way flow meter selection valve 98 in fluid communication with the return hose 88, and to a two-way bypass valve 100 in fluid communication with the tank via the pressure regulator valve 90.

Preferably and in accordance with an important feature of this invention, a contaminated filter sensor system is provided which senses an excessive pressure drop across the fuel filter 94. An electrical vacuum switch 102 is connected to the fuel line 96 between the filter outlet and the pump inlet to sense the pressure of the fluid being pumped to the vehicle. Should there be a pressure drop across the filter 94, in excess of a predetermined limit, the vacuum switch 102 will be tripped to complete an electrical path 104 and 106 to a warning lamp 108. This pressure reading is an indication to the user that the filter is clogged or otherwise in need of replacement. The warning thus given prevents the introduction of dirt and debris into the apparatus and vehicle, and prevents erroneous injector test results due to pressure fluctuations caused by contaminants in the system.

A pair of flow meters 110 and 112 are connected to the flow selection valve 98 and each is provided to pass fuel and to measure the volume of cleaning solvent mixture which is flowing through the cleaner to the vehicle's fuel injectors. The fluid is passed via a pressure gauge selector valve 114 and the pressure of the cleaning solvent mixture being delivered to the vehicle's injectors via the manifold inlet hose 86 is indicated to the operator by one of a pair of high and low pressure gauges 116 and 118 connected to the pressure gauge selector valve 114.

Preferably and in accordance with an important feature of this invention, the pump 54 is in fluid communication to the inlet and return ports 38 and 40 of the fuel rail 32 via the fluid hoses 86 and 88 and its operation is reversible. In a fuel feeding mode, the pump supplies the cleaning solvent mixture under a preselected pressure to the hose 86 via the flow meter selection valve 98 connected to the fuel rail or to the fuel tank 50 via the bypass valve 100 connected to the return fuel hose 88. In the other operating mode, the pump reverses flow direction and withdraws fuel from the engine via both fluid hoses 86 and 88, through the valves 98 and 100, through the fuel filter 94, and back into the fuel tank 50.

The manual pressure regulator valve 90 is a two-way needle valve and permits fuel to pass therethrough and flow into the tank. The pressure regulator valve 90, in combination with the two-way bypass valve 100, sets the system pressure corresponding to that of the vehicle to be tested.

An electronic pressure switch 120 is electrically connected by lines 121 and 122 and is coupled downstream of the pressure gauge selector valve 114 to detect when the fuel supplied is lower than the predetermined gauge pressures at pressure gauges 116 and 118, or is an abnormally low pressure. When this happens, the pressure switch 120 sends an electrical signal through the electrical control system 56 via the line 122 to the electrical relays 72 and 74. This signal is then received by the timing section 58 of the control system, which terminates a timed cycle set by the timing circuit, and reverses the motor and direction of flow through the pump 54. Upon motor and pump reversal, an audible alarm is activated by a horn 123 in order to alert the operator.

Advantageously, such low pressure warning would indicate that in an incorrect hook up of the cleaner tester apparatus to the vehicle, or a failure in a correct hook up. This condition will often result in low pressure at 116 or 118 on the cleaner tester system output. This condition is detected and brought to the operator's attention and the cleaning supply system 48 is deactivated until remedial action is taken.

The control system 58 electrically interconnects a pair of electrical switches 124 and 126, the pump 54, the pressure switch 120, the vacuum switch 102, and each of the injectors. The switch 124 is a power switch to control the flow of electricity from the vehicle's battery to the system and also to provide a means for turning off the system. The switch 126 is a start switch that initiates the timed cleaning cycle and provides for a manual override for the pump reversal.

Figure 3E:
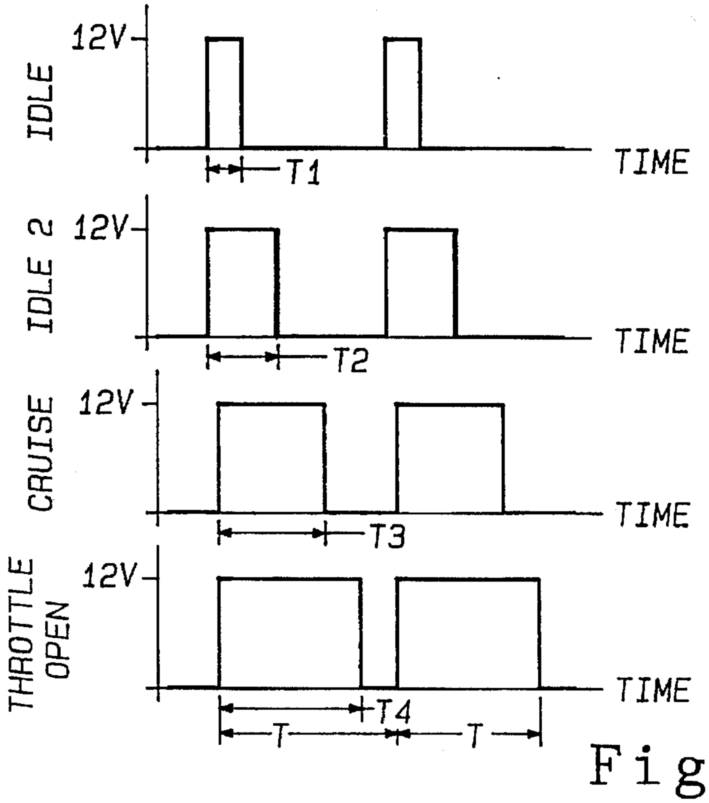
FIG. 3*e* depicts the pulse shapes generated by the pulse generator portion.
Figure 3F:
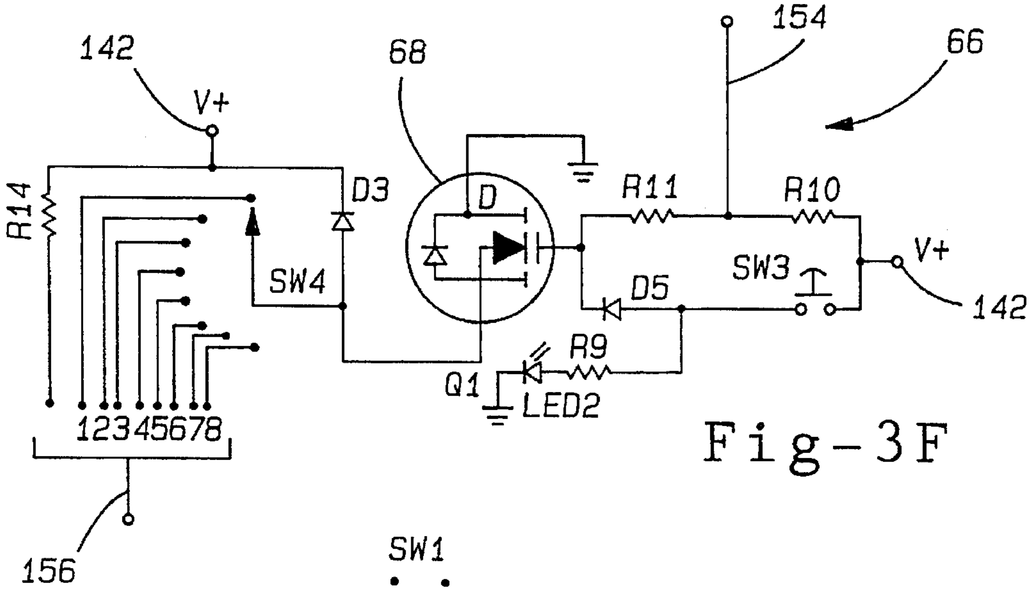
FIG. 3*f* is a schematic diagram of a pulse output portion of the electrical control circuit.
Figure 3G:
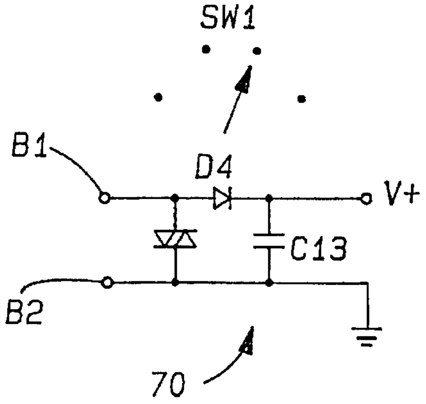
FIG. 3*g* is a schematic diagram of a surge protector portion of the electrical control circuit.
Figure 3H:
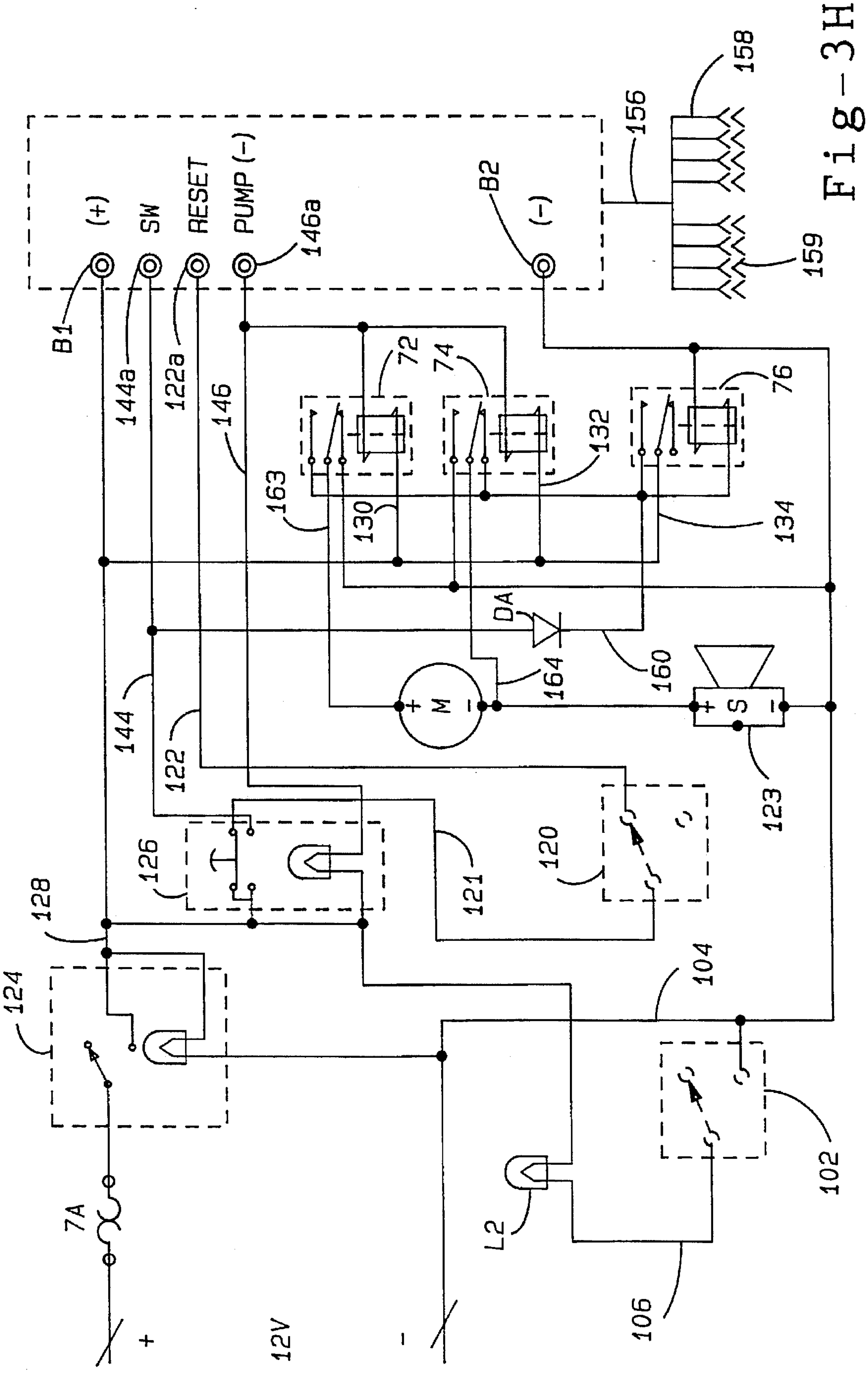
FIG. 3*h* is a schematic diagram of a portion of the electrical control circuit.

As shown in FIG. 3*g*, a surge protection is provided by the circuit portion 70 having nodes B1 and B2. When the power switch 124 is turned on, supplying power via line 128 to the switch 126, to a warning lamp 108, to the vacuum switch 102, and to the relays 72, 74, and 76 via the lines 130, 132 and 134. The power through the node B1 goes through a circuit protection diode D4, a conventional over voltage surge protector available from Panasonic and designated as MOVI, and a capacitor C13, whereby to protect the electrical system from surges and spikes. The power is then distributed via the lines 136 to the timing section 58, the line 138 to the pulse generator section 60, the line 140 to he test switch 64, the line 142 to the pulse output section 66. There is no power to the pulse selector switch 62 at this time.

The timing section 58 provides timing and control logic to the pump control relays 72, 74 and 76. When the start switch 126 is pressed, a signal via the line 144 initiates the timing cycle. The timing capacitor C1 is charged through the timing resistors R19 and J1. When the capacitor C1 reaches a predetermined voltage, a convention integrated circuit chip IC2 manufactured by Exar under the number 2240 is triggered and discharges the capacitor C1. This sets the basic time period for the pump cleaning cycle. The total cleaning time is selected by the proper combination of connections to J2, J3,. . . J9, which connections operate to multiply the basic time.

The pump is controlled by the transistors Q2 and Q3. The transistors Q2 and Q3 are conventional MOSFET's manufactured by International Rectifier and identified, respectively, as IRFS10 and IRFS22. During operation of the pumps, the pump is stopped either by the total preselected time being reached, in which case transistor Q2, which acts like a switch, turns off. This switches the relays 72 and 75 to the line 146, whereby to cause the motor 52 to reverse the pump; or a reset signal is received via line 148 from the pressure switch 120, which in turn causes the timing cycle to be interrupted and causes the pump driver transistor Q2 to turn off as before. During the timing cycle, the transistor Q3 is off, and the transistor Q2 is on, and vice versa.

The pulse generator section 60 is controlled by the pulse selector switch 62 and the test switch 64. The pulse generator section 60 generates an injector operating electrical pulse which is fed to the pulse output section 66.

The pulse generator section 60 is supplied electrical power via the line 138 to a conventional integrated circuit LM 555 pulse generator manufactured by National Semiconductor, which is a timer integrated circuit IC1 configured as a bistable multivibrator to generate a pulsed waveform. A timing capacitor C12 is charged through the line 150, through a resistor pair (i.e., R1 and R5, or R2 and R6, or R3 and R7, or R4 and R8) selected by a rotary switch SW1 in the selector section 62, and controlled by a pair of diodes D1 and D2 connected to the line 152. If desired, bypass protection is provided by a capacitor C6. Further, an optional indicator light is provided by LED1 to indicate injector pulse generator operation.

The test switch section 64 provides a signal to activate the pulse generator section 60. The switch 64 and pulse generator section 60 are connected via the line 153. The pulse that is generated by the pulse generator is transferred to the pulse output selector section 66 via the line 154. This drives an output transistor Q1, which provides an output pulse which is distributed to the appropriate vehicle fuel injector via the switch SW4 and the line 156, forming an injector harness 158 having a connection for each individual injector. Also provided is a switch SW3 to hold the individual fuel injector open to purge air from the lines, the operation of which is indicated by diode LED2.

A diode DA is connected between the line 144 and line 160 to connect to all relays to prevent system "lock up." That is, initially as the switch 126 is depressed, a large positive voltage is transmitted along the line 144, through DA, and to the line 160. The voltage along the line 144 "triggers" the timing circuit 58 and the voltage along line 160 "triggers" the latching relay 76. When the switch 126 is released, the voltage on the line 144 goes to zero, but the voltage on the line 160 stays positive. If the line 144 did not initially have zero voltage, the apparatus would always be driving the pump. The diode DA prevents this undesirable operation.

The control system is desirably provided with a variety of injector pulse types to pulse the vehicle's injectors. These various injector pulse types are selected by the operator via a front control panel. The variety of pulses are intended to simulate different engine operating conditions and are as follows: (a) idle one (small engine); (b) idle two (large engine); (c) cruise; and (d) throttle wide open (i.e., full power).

The availability of a variety of injector pulses provides the user with the advantages of: (a) allowing the operator to test and verify fuel injector operation over the full engine operational range; and (b) affords a more realistic cleaning and testing condition. Injectors are cleaned and tested under conditions which more closely approximate real operational parameters.

FIG. 3*e* depicts the pulse shapes representative of the desired engine operating conditions. Each is repetitive and the pulse has a constant pump duration. The only difference between the pulses is that each pulse operates to hold the injector open for a longer time.

The pulse output section 66 amplifies and distributes the injector operating electrical pulses to the respective fuel injectors 34 through the injector harness 158. The harness includes a plurality of conventional electrical connectors 159 which are adapted to connect to a respective of the ignition posts 42.

In regard to the pulse selector section 66, the pulse shapes shown by FIG. 3*e* would ordinarily have a peak voltage of 12 volts (i.e., that of the battery). However, this voltage could damage the injectors. Accordingly, the resistor R14 moderates the voltage, reducing the peak voltage to a lesser value, thereby reducing heat build-up and possible damage due to too much current in the coil.

Figure 4:
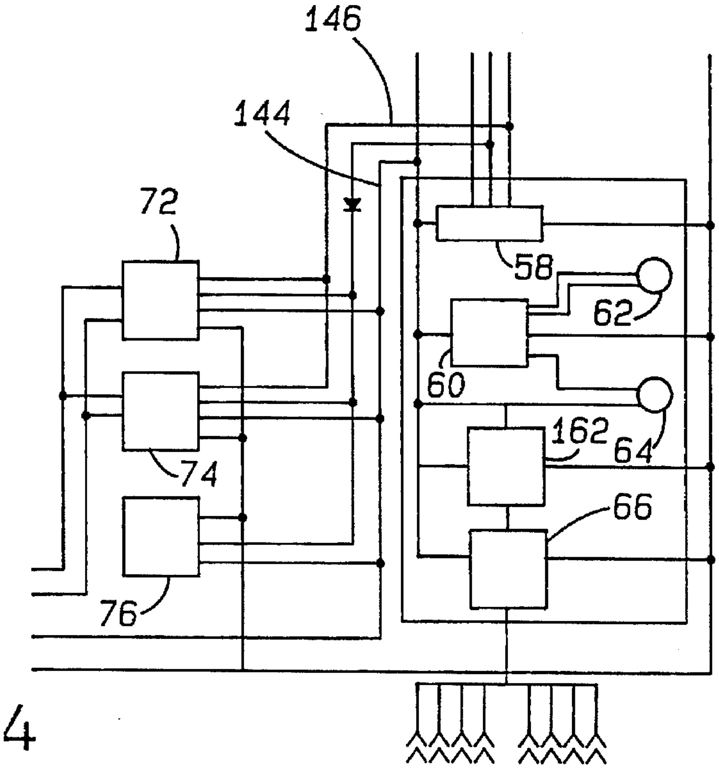
FIG. 4 is a schematic diagram of a portion of the electrical control system modified to include a separate pulse shaper section.
Figure 4A:
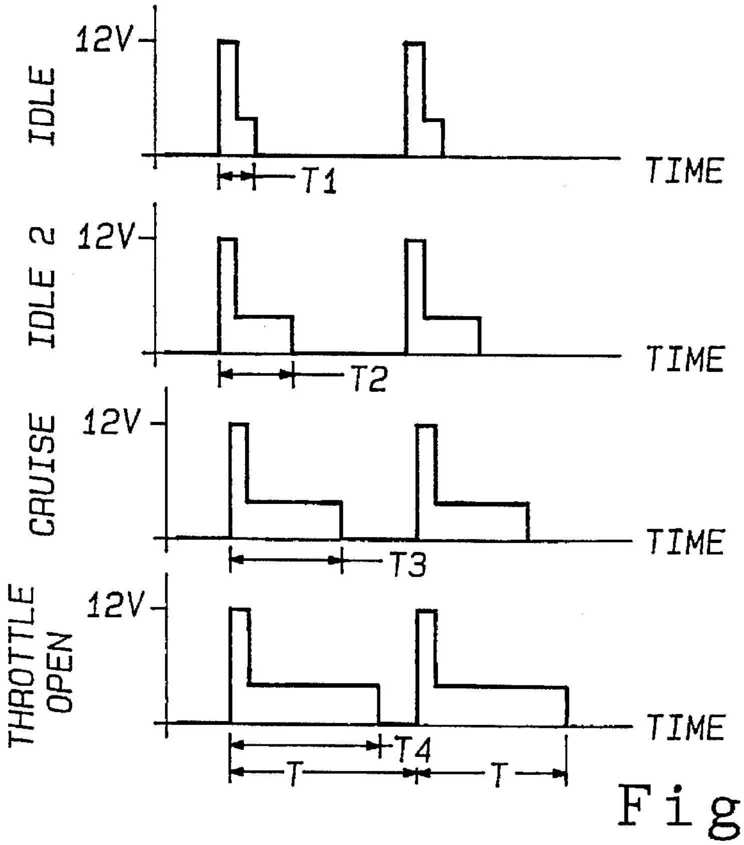
FIG. 4*a* depicts the pulse shapes presented to the injectors by the electrical circuit of FIG. 4.

In accordance with a further feature of this invention, FIG. 4 shows a pulse shaper section 162 adapted to be connected between the pulse generator and the pulse output selector sections 60 and 66. The injector driver Q1 is replaced by an integrated circuit, as desired, which provides the peak (i.e., full voltage initially), and after a predetermined time, drops to a lesser value. The initial burst ensures that the injector opens and a lesser holding voltage is required to maintain it open. Illustrative of such an injector driver are the 2.4 amp and 4 amp devices manufactured by Motorola under the part numbers MC 3484 S2-1, and MC 3484S4-1.

The pulse shaper modifies the injector operating electrical pulse in order to obtain a more certain and effective injector opening, and to hold the injector open in such a manner as to protect the injector from excessive current and heat damage.

The injector pulse shaper allows the injector undergoing testing only to be provided with a sudden high-energy pulse which is quickly followed by a reduction in pulse energy level for the duration of the injector on-time. Providing the injector undergoing cleaning and/or testing with the pulse shaped as described above has certain advantage. A stock injector may be freed by the combination of high-energy pulses and solvent cleaning action. A sluggish injector will be forced to open in a time interval which more closely approximates the design intent. Finally, an injector is protected from being internally damaged by the excessive pound dissipation which will result if the high-energy pulse were continued for the duration of the injector on-time.

In a cleaning operation, the vehicle engine is turned off and the engine fuel feeding system is disabled to enable the apparatus pump and fuel supply to be in substitution for the vehicle fuel feeding system. Disablement can either be by electrically disabling the engine's fuel pump (e.g., removing a fuse) or by connecting a U-tube between the vehicle pump outlet and fuel tank inlet. The inlet and outlet ports 38 and 40 to the engine fuel manifold are connected to the fluid hoses 86 and 88 of the apparatus. The electrical cables 82 and 84 of the apparatus are connected to the terminals 44*a* and 44*b* of the vehicle battery thereby enabling the apparatus to be powered by the vehicle. Alternatively, the apparatus can be connected by the cables 83 and 85 to a separate power source (not shown). The apparatus fuel tank 50 is filled with a suitable fuel mixture of fuel and cleaner/solvent.

The bypass valve 90 is preset to be partially open to ensure a low pressure is in the system. Thereafter, the valve 90 is adjusted to the manufacturers suggested vehicle pressure. The flow meter selection valve 98 would be preset to flowmeter 112 (high volume). The lower volume flowmeter 110 would be used for individual injector testing while the injector is in the vehicle. Further, the pressure gauge selection valve 114 is preset depending on whether a low pressure system is being tested (e.g., 0–10 psig), in which case the pressure gauge 116 would read the system pressure, or whether a high pressure system is being tested (e.g., 10–90 psig), in which case the pressure gauge 118 would read the system pressure.

The power switch 124 is turned on, whereby electrical power is supplied from the vehicle battery 44 to the control system 56. The light 108 on the cart would come on. However, the power switch 124 does not activate the pump 54. When the switch 126 is turned on, the pump starts. The timer circuit 58 is set for a desired period of time. The car is started normally and current flows to the ECM. The engine is then allowed to run until the pressure builds up. This pressure is the above-suggested pressure set by the manufacturer. Valve 90 is reset if this predetermined pressure is not achieved. Preferably, the cleaning would be controlled by the timing circuit 58 to be about 15 minutes.

As the fuel supply runs out, the pressure switch 120 senses a low pressure, and sends a signal through the control timing circuit 58, via the line 122, through the pump relays 72 and 74 via the line 146, and to the alarm 123 via the lines 163 and 164, whereupon the alarm sounds indicating that cleaning is complete, and to the pump 54 via the lines 163 and 164. Simultaneously, the pump 54 reverses direction. This draws all fluid in the fluid lines of the apparatus and the fluid connected to the hoses 86 and 88, back to the apparatus tank 50, via the line 96, whereby to pass the returned fluid through the filter 94. The switch 124 is turned off (i.e., power is off), the apparatus electrical and fluid cables disconnected from the vehicle, and the vehicle fuel lines reconnected.

If a catastrophic pressure drop is experienced, the pressure switch 120 triggers the relays 72 and 74 to reverse the pump, sound the alarm 123, and pull the fuel solvent mixture from the engine and pass same through the filter into the tank.

Should the engine be extremely dirty, the engine is allowed to soak, for another 15 minute period, with the cleaner solvent in the engine. The switch 1 and engine are turned off.

When the cleaning interval has elapsed, the timing circuit 58 sounds the alarm 123 and reverses the rotation of the cleaning fluid pump. This action causes the cleaning fluid, which was being supplied to the injectors under pressure, to be drawn back through the vehicle's plumbing, through the cleaner/tester's hook up and internal plumbing, and into the cleaning fluid supply tank. Advantageously, extraction of the cleaning fluid from the vehicle's fuel plumbing system eliminates and reduces the cleaning fluid's contact with those vehicle components which are subject to be corroded, re-compounded by contaminants or otherwise corrupted by the cleaning fluid.

For a flow testing cycle, the steps are the same as in the cleaning except in this case, the engine is not operated and the vehicle ECM has no input. The harness 158 is connected, in situ, to the engine fuel injectors. Fuel only is placed in the tank 50. The switch 124 is turned on, the switch 126 is depressed, and the pressure builds up in the fuel system.

Using the pulse output selector section 66, one of the injectors 34 is selected. Next, a pulse shape is selected by turning the pulse selector switch 62, depending on whether the injector is to be subjected to (a) an idle 1 condition, (b) an idle 2 condition; (c) a cruise condition; or (d) a throttle wide open condition.

The individual injector selected by pulse output selector section 66 is then activated by depressing the test switch 64. This pulses the injector, based on the pulse shape selected by the selector switch 62. The flow through the flow meter 112 is viewed. If the flow meter has no reading, or if the reading is too low, the valve selector switch 98 is turned to the flow meter 110, and the flow rate checked. If one of the injectors 34 is bad (e.g., no flow or flow out of range) the injector is replaced, or the system recleaned.

It is to be understood that advantageously the cleaner apparatus herein can be used on diesel systems as well as conventional gasoline vehicle engines. For this, the fluid connection conduits would be appropriately dimensioned. However, the apparatus is not useful in flow testing of diesel engines.

REPRESENTATIVE ELEMENT VALUES

| | | | |
|---|---|---|---|
| R1 | 15.4K; 1%; ¼W | C1 | 3.3 ufd; 16v; 5% tantalum |
| R2 | 29.4K; 1%; ¼W | C2 | 270 pfd; 50v; ceramic |
| R3 | 124.0K; 1%; ¼W | C3 | 0.01 ufd; 50v; ceramic |
| R4 | 187.0K; 1%; ¼W | C4, C9, C13, C5 | 0.1 ufd; 50C; ceramic |
| R5 | 301.0K; 1%; ¼W | C12 | 0.1 ufd; 2%; polypropylene |
| R6 | 294.0K; 1%; ¼W | D1, D2, D5, D6 | IN914, diode |
| R7 | 165.0K; 1%; ¼W | | |
| R8 | 82.5K; 1%; ¼W | D3, D4 | IN4003 IA 200v, diode |
| R9, R12 | 510.0K; 5%; ¼W | Q1 | IRF Z10, MOSFET |
| R10, R11, R13, R15, R17, R20, R22, R23, R24 | 10K; 5%; ¼W | | |
| R14 | 3.3K; 5%; 10W | Q2 | IRF Z22, MOSFET |
| R16 | 33.0K; 5%; ¼W | Q3 | 2N4401ss, transistor |
| R18 | 20K; 1%; ¼W | MOVI | 20 volt varistor |
| R19 | 1M; 1%; ¼W | ICI | LM555 timer IC |
| R21 | 1K; 1%; ¼W | IC2 | 2240 timer IC |

While the above description constitutes the preferred embodiment of the invention, it will be appreciated that the invention is susceptible to modification, variation, and change without departing from the proper scope or fair meaning of the accompanying claims.

We claim:

1. An apparatus for cleaning and/or testing the fuel injection valve system of a vehicle engine, wherein said apparatus defines an independent fuel system attachable to the vehicle engine so as to temporarily replace the engine's fuel system, the apparatus comprising:

a fuel/chemical mixture tank having an outlet line and a return line in communication, respectively, with fuel inlet and outlet ports of the engine for communicating fuel to one of the fuel injectors;

fuel pump means, separate and apart from the vehicle engine, for pumping fuel/chemical mixture from said tank into the fuel inlet port of said engine;

a fuel filter interposed in said fuel line and between the mixture tank and the fuel pump;

a first sensor means, interposed between the pump and the filter, for detecting the fluid pressure drop across the filter during operation of the pump and generating a first signal;

a second sensor means, downstream of the pump, for detecting the fluid pressure at the inlet to the engine and generating a second signal; and electronic control means for controlling the operation of the pump during operation of the engine being cleaned, said control means including first circuit means, connected to the pump and responsive to said first signal, for operating the pump in a fuel feeding mode when the pressure drop is below a predetermined threshold and deactivating the pump when the pressure drop exceeds the predetermined threshold, and second circuit means, connected to the pump and responsive to said second signal, for operating the pump in a fuel retracting mode whereby to draw the cleaner fluid back to the mixture tank via the outlet line, said first and second circuit means being connected in series with one another.

2. The apparatus as claimed in claim 1, wherein said control means includes timer means for running the pump means a predetermined time.

3. The apparatus as claimed in claim 1, further including flow measuring means for measuring the flow of fuel through each injector while the injector is operably secured to and associated with the engine, and pulse means for controlling the duration of fuel flow through the injector.

4. The apparatus of claim 1 further comprising an injector control means separate and apart from the vehicle engine, for selectively operating injectors to enable cleaning and/or testing of the injectors.

5. An apparatus for cleaning and/or testing the fuel injection system of a vehicle engine, the vehicle engine of the type including at least one fuel injector operably secured to and associated with the engine, fuel supplying means including an engine pump for supplying fuel to the fuel injector, injector controlling means for controlling the operation of the fuel injectors whereby to feed fuel to the engine cylinders associated with the injectors, and power means for powering the controlling means, the improvement comprising pump means separate and apart from the vehicle for feeding fuel into the fuel supplying means, control means for controlling the pump means, including control means separate and apart from the vehicle for operating said at least one fuel injector while said injector is disposed in operable association with said vehicle engine and means for operating the pump in the fuel feeding mode and in a fuel withdrawing mode whereby to retract fuel from the system, and means for operably associating said pump means with said fuel supplying means and disabling said fuel supplying means to permit said pump means to be the sole source of the fuel supply for said at least one fuel injector.

6. The apparatus as claimed in claim 5, wherein the apparatus comprises flow measuring means for measuring the flow of fuel through each injection valve during the operation of the injection valve and while the injection valve is operably secured to and associated with said engine, and pulse means for controlling the duration of fuel flow through each injection valve.

7. A method of cleaning carbon deposits fromt the fuel injectors of vehicle engine having its fuel pump disabled and replaced by a carbon cleaning apparatus having an independent fuel pump and fuel system, said method comprising the steps of:

disconnecting said engine pump from operable relation with said vehicle engine and plugging the inlet and return fuel lines of said engine, attaching an output and return fuel line of said independent fuel system to said engine to replace the fuel lines communicating with the engine's fuel injectors, presetting the fuel pressure of the apparatus, connecting a fuel/chemical mixture tank to said output and return lines of said independent fuel system, so as to define a fuel/chemical flow subsystem as required for transferring the mixture from said mixture tank to said engine, substantially simultaneously pumping fuel to said engine injectors and monitoring pressure drop through said input and output lines, the excess mixture fuel being returned to said mixture tank while said engine is operating, filtering the fuel/chemical mixture being discharged from said mixture tank, monitoring pressure drop through said filter, and discontinuing pumping when the pressure being monitored falls below a preselected value or when a desired flow of fuel has been measured.

8. The method as claimed in claim 7 further comprising the steps of monitoring the pressure drop of the fuel into the engine, and reversing the pump and the direction of fuel flow when the pressure drop monitored at the engine inlet falls below a predetermined value, said pump drawing the excess fluid from the engine and apparatus and directing both through the filter and into the tank.

* * * * *